United States Patent
Kim et al.

(10) Patent No.: US 10,395,140 B1
(45) Date of Patent: *Aug. 27, 2019

(54) LEARNING METHOD AND LEARNING DEVICE FOR OBJECT DETECTOR BASED ON CNN USING 1×1 CONVOLUTION TO BE USED FOR HARDWARE OPTIMIZATION, AND TESTING METHOD AND TESTING DEVICE USING THE SAME

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongbuk (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,887

(22) Filed: Jan. 23, 2019

(51) Int. Cl.
G06K 9/00 (2006.01)
G06K 9/62 (2006.01)
G06N 3/08 (2006.01)

(52) U.S. Cl.
CPC ......... *G06K 9/6257* (2013.01); *G06K 9/6262* (2013.01); *G06K 9/6268* (2013.01); *G06N 3/084* (2013.01)

(58) Field of Classification Search
CPC .. G06K 9/6257; G06K 9/6262; G06K 9/6268; G06N 3/084
See application file for complete search history.

(56) References Cited

U.S. PATENT DOCUMENTS 10,007,865 B1 * 6/2018 Kim ................. G06K 9/6231
10,169,679 B1 * 1/2019 Kim ................. G06K 9/6256
(Continued)

OTHER PUBLICATIONS

Badrinarayanan et al., SegNet: A Deep Convolutional Encoder-Decoder Architecture for Image Segmentation, IEEE Transactions on Pattern Analysis and Machine Intelligence, Dec. 2017.*
(Continued)

*Primary Examiner* — John B Strege
(74) *Attorney, Agent, or Firm* — Husch Blackwell LLP

(57) ABSTRACT

A method for learning parameters of an object detector based on a CNN is provided to be used for hardware optimization which satisfies KPI. The method includes steps of: a learning device instructing a first transposing layer or a pooling layer to generate an integrated feature map by concatenating pixels per each proposal; and instructing a second transposing layer or a classifying layer to divide volume-adjusted feature map, generated by using the integrated feature map, by pixel, and instructing the classifying layer to generate object class information. By this method, size of a chip can be decreased as convolution operations and fully connected layer operations can be performed by a same processor. Accordingly, there are advantages such as no need to build additional lines in a semiconductor manufacturing process, power saving, more space to place other modules instead of an FC module in a die, and the like.

28 Claims, 9 Drawing Sheets

(56) References Cited

U.S. PATENT DOCUMENTS

| | | | | |
|---|---|---|---|---|
| 10,198,671 | B1* | 2/2019 | Yang | G06K 9/6269 |
| 10,223,614 | B1* | 3/2019 | Kim | G06K 9/6262 |
| 10,229,346 | B1* | 3/2019 | Kim | G06K 9/6262 |
| 2016/0148079 | A1* | 5/2016 | Shen | G06K 9/4628 |
| | | | | 382/157 |
| 2016/0148080 | A1* | 5/2016 | Yoo | G06K 9/4628 |
| | | | | 382/157 |
| 2017/0011281 | A1* | 1/2017 | Dijkman | G06K 9/66 |
| 2017/0124409 | A1* | 5/2017 | Choi | G06N 3/0454 |
| 2017/0124415 | A1* | 5/2017 | Choi | G06N 3/08 |
| 2017/0169315 | A1* | 6/2017 | Vaca Castano | G06K 9/3233 |
| 2017/0206431 | A1* | 7/2017 | Sun | G06N 3/084 |
| 2018/0096457 | A1* | 4/2018 | Savvides | G06K 9/6267 |
| 2018/0137642 | A1* | 5/2018 | Malisiewicz | G06T 7/11 |
| 2018/0211403 | A1* | 7/2018 | Hotson | G06K 9/4604 |
| 2018/0268234 | A1* | 9/2018 | Yang | G06N 3/063 |
| 2018/0336469 | A1* | 11/2018 | O'Connor | G06N 3/04 |
| 2019/0012548 | A1* | 1/2019 | Levi | G06K 9/00791 |
| 2019/0026917 | A1* | 1/2019 | Liao | G06T 7/73 |
| 2019/0050681 | A1* | 2/2019 | Tate | G06K 9/6232 |
| 2019/0073553 | A1* | 3/2019 | Yao | G06K 9/46 |

OTHER PUBLICATIONS

Sun et al., Face detection using deep learning: an improved faster RCNN approach, Elsevier B.V., Mar. 2018.*

Ren et al., Faster R-CNN: Towards Real-Time Object Detection with Region Proposal Networks, 2015.*

Du et al., Fused DNN: A deep neural network fusion approach to fast and robust pedestrian detection, IEEE, 2017.*

Girshick et al., Fast R-CNN, 2015.*

* cited by examiner

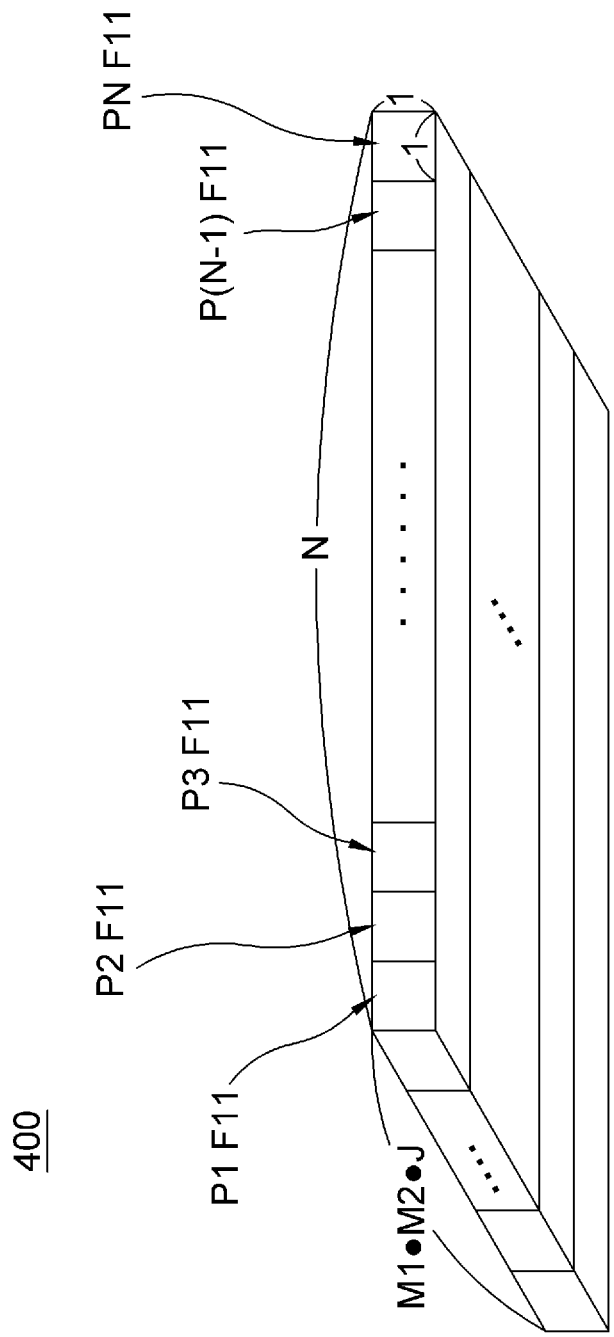

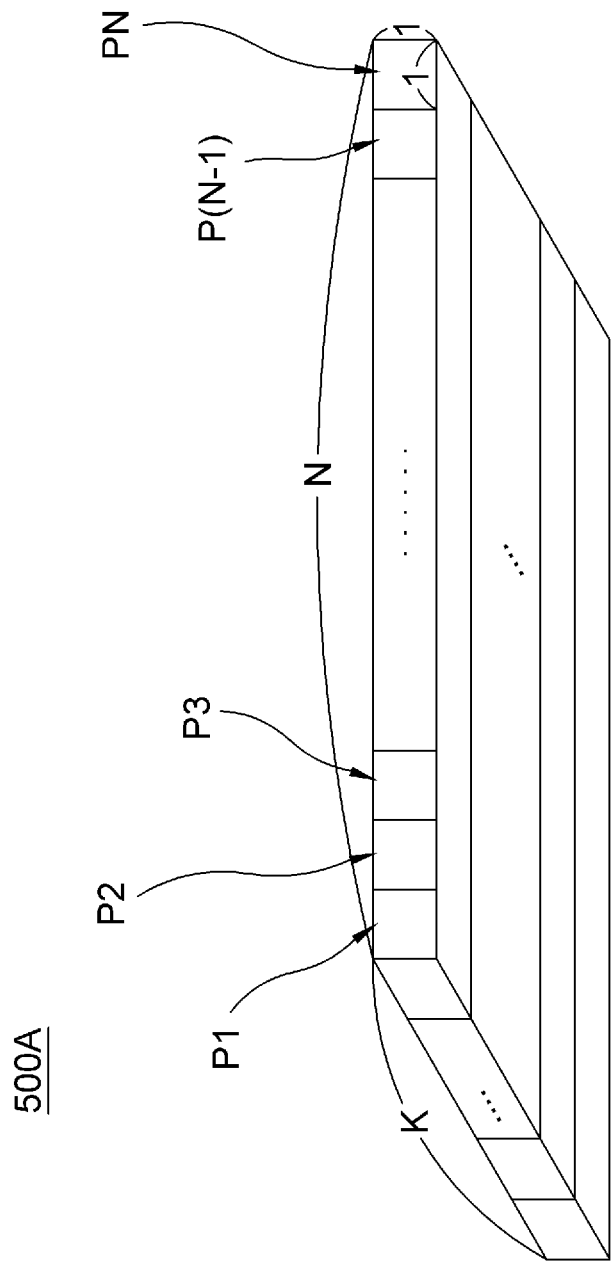

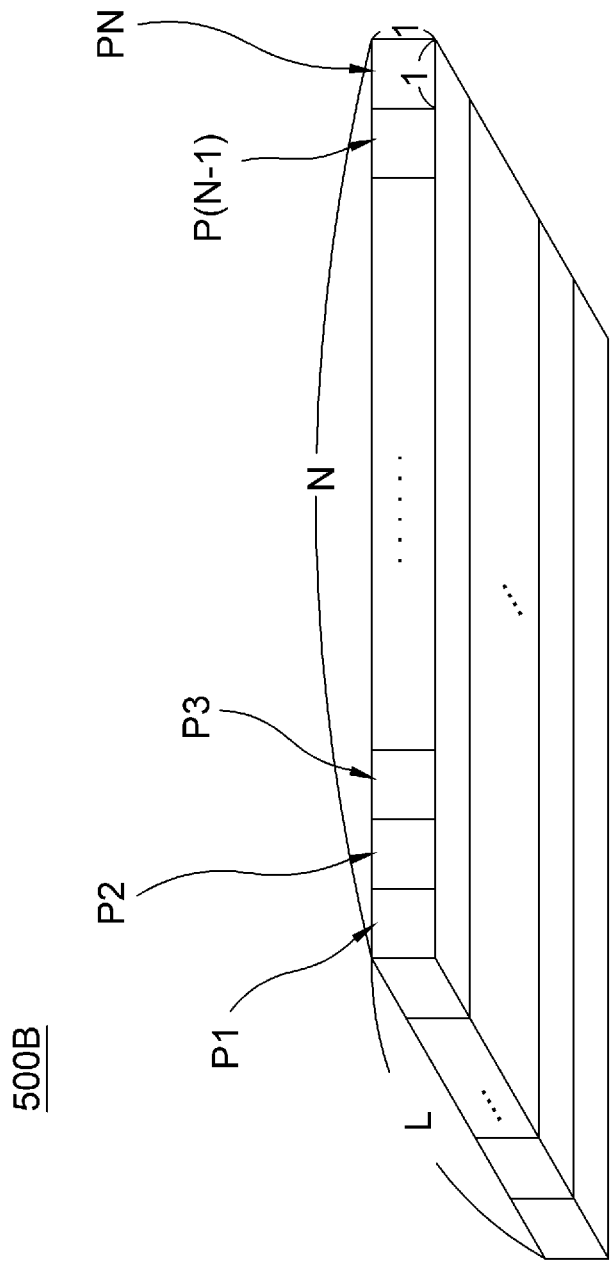

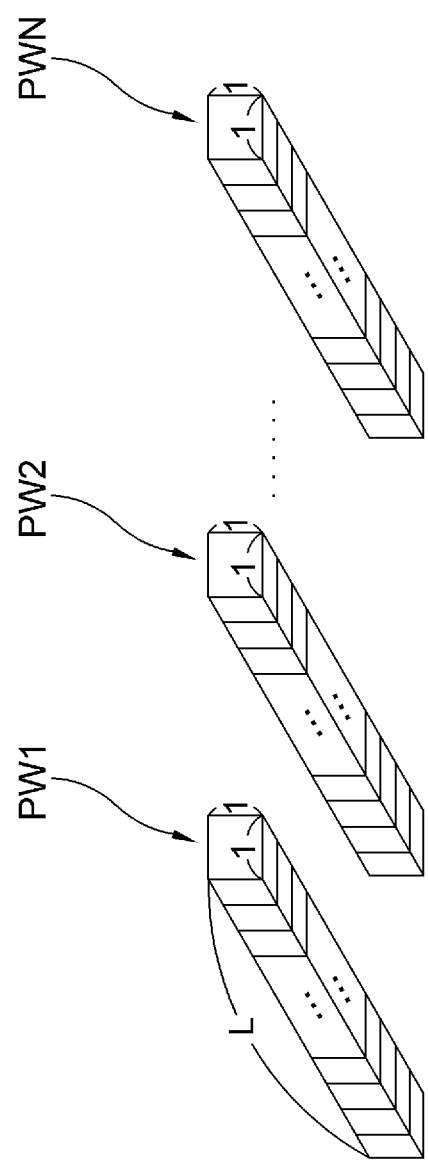

LEARNING METHOD AND LEARNING DEVICE FOR OBJECT DETECTOR BASED ON CNN USING 1×1 CONVOLUTION TO BE USED FOR HARDWARE OPTIMIZATION, AND TESTING METHOD AND TESTING DEVICE USING THE SAME

FIELD OF THE DISCLOSURE

The present disclosure relates to a method for learning parameters of an object detector based on a CNN to be used for hardware optimization; and more particularly, to the method for learning the parameters of the object detector based on the CNN, including steps of: (a) if at least one training image is acquired, (i) instructing one or more convolutional layers to generate at least one initial feature map by applying one or more convolution operations to the training image, (ii) instructing an RPN to generate one or more proposals corresponding to each of one or more objects in the training image by using the initial feature map, and (iii) (iii-1) instructing a pooling layer to apply one or more pooling operations to each region, corresponding to each of the proposals, on the initial feature map, to thereby generate pooled feature maps per each of the proposals, and instructing a first transposing layer to concatenate each of pixels, per each of the proposals, in each of corresponding same locations on the pooled feature maps per each of the proposals, to thereby generate an integrated feature map, or (iii-2) instructing the pooling layer to apply the pooling operations to each region, corresponding to each of the proposals, on the initial feature map, to thereby generate the pooled feature maps per each of the proposals, and instructing the pooling layer to concatenate each of the pixels, per each of the proposals, in each of the corresponding same locations on the pooled feature maps per each of the proposals, to thereby generate the integrated feature map; (b) instructing a first 1×1 convolutional layer to apply a 1×1 convolution operation to the integrated feature map, to thereby generate a first adjusted feature map whose volume is adjusted, and instructing a second 1×1 convolutional layer to apply the 1×1 convolution operation to the first adjusted feature map, to thereby generate a second adjusted feature map whose volume is adjusted; and (c) (c1) (i) instructing a second transposing layer to divide the second adjusted feature map by each of the pixels, to thereby generate pixel-wise feature maps per each of the proposals, and instructing a classifying layer to generate object class information on each of the proposals by using the pixel-wise feature maps per each of the proposals, or (ii) instructing the classifying layer to divide the second adjusted feature map by each of the pixels, to thereby generate the pixel-wise feature maps per each of the proposals, and instructing the classifying layer to generate the object class information on each of the proposals by using the pixel-wise feature maps per each of the proposals, (c2) instructing a detecting layer to generate object detection information corresponding to the objects in the training image by referring to the object class information and the pixel-wise feature maps per each of the proposals, and (c3) instructing a detection loss layer to calculate one or more object detection losses by referring to the object detection information and its corresponding GT, to thereby learn at least part of parameters of the second 1×1 convolutional layer, the first 1×1 convolutional layer, and the convolutional layers by backpropagating the object detection losses, and a learning device, a testing method, and a testing device using the same.

BACKGROUND OF THE DISCLOSURE

Deep Convolution Neural Networks (Deep CNNs) are at the heart of the remarkable development in deep learning. CNNs have already been used in the 90's to solve the problems of character recognition, but their use has become as widespread as it is now thanks to recent research. These deep CNNs won the 2012 ImageNet image classification tournament, crushing other competitors. Then, the convolutional neural network became a very useful tool in the field of the machine learning.

The CNN is comprised of a feature extractor which extracts features from an image, and a feature classifier which detects objects in the image or recognizes the image by referring to the features extracted by the feature extractor.

Further, the feature extractor of the CNN is comprised of convolutional layers, and the feature classifier is comprised of FC layers capable of applying fully connected operations to the features extracted by the feature extractor.

However, the FC layers have problems in that weights have to be generated for every feature inputted, and the fully connected operations have to be performed for every feature inputted, resulting in heavy computational load.

Further, the FC layers require a size of its input image to be same as a size preset according to an FC layer model. Therefore, if a training image or a test image having a size different from the preset size is inputted into a CNN including the FC layers, although the convolutional layers may apply their operations successfully to the training image or the test image, the FC layers cannot apply their operations to the training image or the test image, as the size of the input image is different from the preset size.

Accordingly, the inventors of the present disclosure propose an object detector based on the CNN capable of overcoming the problems of the FC layers.

SUMMARY OF THE DISCLOSURE

It is an object of the present disclosure to solve all the aforementioned problems.

It is another object of the present disclosure to provide an object detector based on a CNN capable of detecting objects on at least one input image without regard to a size of the input image.

It is still another object of the present disclosure to provide the object detector based on the CNN capable of minimizing the number of weights for feature classification.

It is still yet another object of the present disclosure to provide the object detector based on the CNN capable of minimizing amount of computation for the feature classification.

In accordance with one aspect of the present disclosure, there is provided a method for learning parameters of an object detector based on a CNN, including steps of: (a) a learning device, if at least one training image is acquired, (i) instructing one or more convolutional layers to generate at least one initial feature map by applying one or more convolution operations to the training image, (ii) instructing an RPN to generate one or more proposals corresponding to each of one or more objects in the training image by using the initial feature map, and (iii) (iii-1) instructing a pooling layer to apply one or more pooling operations to each region, corresponding to each of the proposals, on the initial feature map, to thereby generate pooled feature maps per each of the proposals, and instructing a first transposing layer to concatenate each of pixels, per each of the proposals, in each of corresponding same locations on the pooled feature maps per each of the proposals, to thereby generate an integrated feature map, or (iii-2) instructing the pooling layer to apply the pooling operations to each region, corresponding to each of the proposals, on the initial feature map, to thereby generate the pooled feature maps per each of the proposals, and instructing the pooling layer to concatenate each of the pixels, per each of the proposals, in each of the corresponding same locations on the pooled feature maps per each of the proposals, to thereby generate the integrated feature map; (b) the learning device instructing a first 1×1 convolutional layer to apply a 1×1 convolution operation to the integrated feature map, to thereby generate a first adjusted feature map whose volume is adjusted, and instructing a second 1×1 convolutional layer to apply the 1×1 convolution operation to the first adjusted feature map, to thereby generate a second adjusted feature map whose volume is adjusted; and (c) the learning device (c1) (i) instructing a second transposing layer to divide the second adjusted feature map by each of the pixels, to thereby generate pixel-wise feature maps per each of the proposals, and instructing a classifying layer to generate object class information on each of the proposals by using the pixel-wise feature maps per each of the proposals, or (ii) instructing the classifying layer to divide the second adjusted feature map by each of the pixels, to thereby generate the pixel-wise feature maps per each of the proposals, and instructing the classifying layer to generate the object class information on each of the proposals by using the pixel-wise feature maps per each of the proposals, (c2) instructing a detecting layer to generate object detection information corresponding to the objects in the training image by referring to the object class information and the pixel-wise feature maps per each of the proposals, and (c3) instructing a detection loss layer to calculate one or more object detection losses by referring to the object detection information and its corresponding GT, to thereby learn at least part of parameters of the second 1×1 convolutional layer, the first 1×1 convolutional layer, and the convolutional layers by backpropagating the object detection losses.

As one example, after the step of (a), the learning device instructs an RPN loss layer to calculate one or more RPN losses by referring to the proposals and their corresponding ground truths, to thereby learn at least part of parameters of the RPN by backpropagating the RPN losses.

As one example, supposing that the number of the proposals is N, and that a width of the pooled feature maps per each of the proposals is M1 and a height thereof is M2, and that the number of channels of the pooled feature maps per each of the proposals is J, at the step of (a), the learning device (i) instructs the first transposing layer to convert the pooled feature maps per each of the proposals into the integrated feature map having a width of N, a height of 1, and a channel of M1·M2·J, or (ii) instructs the pooling layer to convert the pooled feature maps per each of the proposals into the integrated feature map having the width of N, the height of 1, and the channel of M1·M2·J.

As one example, supposing that the number of filters in the first 1×1 convolutional layer is K, and that the number of filters in the second 1×1 convolutional layer is L, at the step of (b), the learning device instructs the first 1×1 convolutional layer to generate the first adjusted feature map having a volume of N·1·K resulting from a width of N, a height of 1, and a channel of K, and instructs the second 1×1 convolutional layer to generate the second adjusted feature map having a volume of N·1·L resulting from the width of N, the height of 1, and a channel of L.

As one example, at the step of (c), the learning device (i) instructs the second transposing layer to convert the second adjusted feature map into the pixel-wise feature maps per each of the proposals having a volume of 1·1·L, resulting from a width of 1, a height of 1, and a channel of L, corresponding to each of N proposals, or (ii) instructs the classifying layer to convert the second adjusted feature map into the pixel-wise feature maps per each of the proposals having the volume of 1·1·L, resulting from the width of 1, the height of 1, and the channel of L, corresponding to each of the N proposals.

As one example, the classifying layer uses at least one softmax algorithm.

As one example, the detecting layer uses at least one non-maximum suppression algorithm.

In accordance with another aspect of the present disclosure, there is provided a method for testing an object detector based on a CNN, including steps of: (a) on condition that a learning device (1) (i) has instructed one or more convolutional layers to generate at least one initial feature map for training by applying one or more convolution operations to at least one training image, (ii) has instructed an RPN to generate one or more proposals for training corresponding to each of one or more objects for training in the training image by using the initial feature map for training, and (iii) (iii-1) has instructed a pooling layer to apply one or more pooling operations to each region, corresponding to each of the proposals for training, on the initial feature map for training, to thereby generate pooled feature maps for training per each of the proposals for training, and has instructed a first transposing layer to concatenate each of pixels, per each of the proposals for training, in each of corresponding same locations on the pooled feature maps for training per each of the proposals for training, to thereby generate an integrated feature map for training, or (iii-2) has instructed the pooling layer to apply the pooling operations to each region, corresponding to each of the proposals for training, on the initial feature map for training, to thereby generate the pooled feature maps for training per each of the proposals for training, and has instructed the pooling layer to concatenate each of the pixels, per each of the proposals for training, in each of the corresponding same locations on the pooled feature maps for training per each of the proposals for training, to thereby generate the integrated feature map for training, (2) has instructed a first 1×1 convolutional layer to apply a 1×1 convolution operation to the integrated feature map for training, to thereby generate a first adjusted feature map for training whose volume is adjusted, and has instructed a second 1×1 convolutional layer to apply the 1×1 convolution operation to the first adjusted feature map for training, to thereby generate a second adjusted feature map for training whose volume is adjusted, and (3) (3-1) (i) has instructed a second transposing layer to divide the second adjusted feature map for training by each of the pixels, to thereby generate pixel-wise feature maps for training per each of the proposals for training, and has instructed a classifying layer to generate object class information for training on each of the proposals for training by using the pixel-wise feature maps for training per each of the proposals for training, or (ii) has instructed the classifying layer to divide the second adjusted feature map for training by each of the pixels, to thereby generate the pixel-wise feature maps for training per each of the proposals for training, and has instructed the classifying layer to generate the object class information for training on each of the proposals for training by using the pixel-wise feature maps for training per each of the proposals for training, (3-2) has instructed a detecting layer to generate object detection information for training corresponding to the objects for training in the training image by referring to the object class information for training and the pixel-wise feature maps for training per each of the proposals for training, and (3-3) has instructed a detection loss layer to calculate one or more object detection losses by referring to the object detection information for training and its corresponding GT, to thereby learn at least part of parameters of the second 1×1 convolutional layer, the first 1×1 convolutional layer, and the convolutional layers by backpropagating the object detection losses; a testing device, if at least one test image is acquired, (i) instructing the convolutional layers to generate at least one initial feature map for testing by applying the convolution operations to the test image, (ii) instructing the RPN to generate one or more proposals for testing corresponding to each of one or more objects for, testing in the test image by using the initial feature map for testing, and (iii) (iii-1) instructing the pooling layer to apply the pooling operations to each region, corresponding to each of the proposals for testing, on the initial feature map for testing, to thereby generate pooled feature maps for testing per each of the proposals for testing, and instructing a first transposing layer to concatenate each of pixels, per each of the proposals for testing, in each of corresponding same locations on the pooled feature maps for testing per each of the proposals for testing, to thereby generate an integrated feature map for testing, or (iii-2) instructing the pooling layer to apply the pooling operations to each region, corresponding to each of the proposals for testing, on the initial feature map for testing, to thereby generate the pooled feature maps for testing per each of the proposals for testing, and instructing the pooling layer to concatenate each of the pixels, per each of the proposals for testing, in each of the corresponding same locations on the pooled feature maps for testing per each of the proposals for testing, to thereby generate the integrated feature map for testing; (b) the testing device instructing the first 1×1 convolutional layer to apply the 1×1 convolution operation to the integrated feature map for testing, to thereby generate a first adjusted feature map for testing whose volume is adjusted, and instructing the second 1×1 convolutional layer to apply the 1×1 convolution operation to the first adjusted feature map for testing, to thereby generate a second adjusted feature map for testing whose volume is adjusted; and (c) the testing device (c1) (i) instructing the second transposing layer to divide the second adjusted feature map for testing by each of the pixels, to thereby generate pixel-wise feature maps for testing per each of the proposals for testing, and instructing the classifying layer to generate object class information for testing on each of the proposals for testing by using the pixel-wise feature maps for testing per each of the proposals for testing, or (ii) instructing the classifying layer to divide the second adjusted feature map for testing by each of the pixels, to thereby generate the pixel-wise feature maps for testing per each of the proposals for testing, and instructing the classifying layer to generate the object class information for testing on each of the proposals for testing by using the pixel-wise feature maps for testing per each of the proposals for testing, and (c2) instructing the detecting layer to generate object detection information for testing corresponding to the objects for testing in the test image by referring to the object class information for testing and the pixel-wise feature maps for testing per each of the proposals for testing.

As one example, after the process of (1), the learning device has instructed an RPN loss layer to calculate one or more RPN losses by referring to the proposals for testing and their corresponding ground truths, to thereby learn at least part of parameters of the RPN by backpropagating the RPN losses.

As one example, supposing that the number of the proposals for testing is N, and that a width of the pooled feature maps for testing per each of the proposals for testing is M1 and a height thereof is M2, and that the number of channels of the pooled feature maps for testing per each of the proposals for testing is J, at the step of (a), the testing device (i) instructs the first transposing layer to convert the pooled feature maps for testing per each of the proposals for testing into the integrated feature map for testing having a width of N, a height of 1, and a channel of M1·M2·J, or (ii) instructs the pooling layer to convert the pooled feature maps for testing per each of the proposals for testing into the integrated feature map for testing having the width of N, the height of 1, and the channel of M1·M2·J.

As one example, supposing that the number of filters in the first 1×1 convolutional layer is K, and that the number of filters in the second 1×1 convolutional layer is L, at the step of (b), the testing device instructs the first 1×1 convolutional layer to generate the first adjusted feature map for testing having a volume of N·1·K resulting from a width of N, a height of 1, and a channel of K, and instructs the second 1×1 convolutional layer to generate the second adjusted feature map for testing having a volume of N·1·L resulting from the width of N, the height of 1, and a channel of L.

As one example, at the step of (c), the testing device (i) instructs the second transposing layer to convert the second adjusted feature map for testing into the pixel-wise feature maps for testing per each of the proposals for testing having a volume of 1·1·L, resulting from a width of 1, a height of 1, and a channel of L, corresponding to each of N proposals for testing, or (ii) instructs the classifying layer to convert the second adjusted feature map for testing into the pixel-wise feature maps for testing per each of the proposals for testing having the volume of 1·1·L, resulting from the width of 1, the height of 1, and the channel of L, corresponding to each of the N proposals for testing.

As one example, the classifying layer uses at least one softmax algorithm.

As one example, the detecting layer uses at least one non-maximum suppression algorithm.

In accordance with still another aspect of the present disclosure, there is provided a learning device for learning parameters of an object detector based on a CNN, including: at least one memory that stores instructions; and at least one processor configured to execute the instructions to: perform processes of (I) (i) instructing one or more convolutional layers to generate at least one initial feature map by applying one or more convolution operations to at least one training image, (ii) instructing an RPN to generate one or more proposals corresponding to each of one or more objects in the training image by using the initial feature map, and (iii) (iii-1) instructing a pooling layer to apply one or more pooling operations to each region, corresponding to each of the proposals, on the initial feature map, to thereby generate pooled feature maps per each of the proposals, and instructing a first transposing layer to concatenate each of pixels, per each of the proposals, in each of corresponding same locations on the pooled feature maps per each of the proposals, to thereby generate an integrated feature map, or (iii-2) instructing the pooling layer to apply the pooling operations to each region, corresponding to each of the proposals, on the initial feature map, to thereby generate the pooled feature maps per each of the proposals, and instructing the pooling layer to concatenate each of the pixels, per each of the proposals, in each of the corresponding same locations on the pooled feature maps per each of the proposals, to thereby generate the integrated feature map, (II) instructing a first 1×1 convolutional layer to apply a 1×1 convolution operation to the integrated feature map, to thereby generate a first adjusted feature map whose volume is adjusted, and instructing a second 1×1 convolutional layer to apply the 1×1 convolution operation to the first adjusted feature map, to thereby generate a second adjusted feature map whose volume is adjusted, and (III) (III-1) (i) instructing a second transposing layer to divide the second adjusted feature map by each of the pixels, to thereby generate pixel-wise feature maps per each of the proposals, and instructing a classifying layer to generate object class information on each of the proposals by using the pixel-wise feature maps per each of the proposals, or (ii) instructing the classifying layer to divide the second adjusted feature map by each of the pixels, to thereby generate the pixel-wise feature maps per each of the proposals, and instructing the classifying layer to generate the object class information on each of the proposals by using the pixel-wise feature maps per each of the proposals, (111-2) instructing a detecting layer to generate object detection information corresponding to the objects in the training image by referring to the object class information and the pixel-wise feature maps per each of the proposals, and (111-3) instructing a detection loss layer to calculate one or more object detection losses by referring to the object detection information and its corresponding GT, to thereby learn at least part of parameters of the second 1×1 convolutional layer, the first 1×1 convolutional layer, and the convolutional layers by backpropagating the object detection losses.

As one example, after the process of (I), the processor instructs an RPN loss layer to calculate one or more RPN losses by referring to the proposals and their corresponding ground truths, to thereby learn at least part of parameters of the RPN by backpropagating the RPN losses.

As one example, supposing that the number of the proposals is N, and that a width of the pooled feature maps per each of the proposals is M1 and a height thereof is M2, and that the number of channels of the pooled feature maps per each of the proposals is J, at the process of (I), the processor (i) instructs the first transposing layer to convert the pooled feature maps per each of the proposals into the integrated feature map having a width of N, a height of 1, and a channel of M1·M2·J, or (ii) instructs the pooling layer to convert the pooled feature maps per each of the proposals into the integrated feature map having the width of N, the height of 1, and the channel of M1·M2·J.

As one example, supposing that the number of filters in the first 1×1 convolutional layer is K, and that the number of filters in the second 1×1 convolutional layer is L, at the process of (II), the processor instructs the first 1×1 convolutional layer to generate the first adjusted feature map having a volume of N·1·K resulting from a width of N, a height of 1, and a channel of K, and instructs the second 1×1 convolutional layer to generate the second adjusted feature map having a volume of N·1·L resulting from the width of N, the height of 1, and a channel of L.

As one example, at the process of (III), the processor (i) instructs the second transposing layer to convert the second adjusted feature map into the pixel-wise feature maps per each of the proposals having a volume of 1·1·L, resulting from a width of 1, a height of 1, and a channel of L, corresponding to each of N proposals, or (ii) instructs the classifying layer to convert the second adjusted feature map into the pixel-wise feature maps per each of the proposals having the volume of 1·1·L, resulting from the width of 1, the height of 1, and the channel of L, corresponding to each of the N proposals.

As one example, the classifying layer uses at least one softmax algorithm.

As one example, the detecting layer uses at least one non-maximum suppression algorithm.

In accordance with still yet another aspect of the present disclosure, there is provided a testing device for testing an object detector based on a CNN, including: at least one memory that stores instructions; and at least one processor, on condition that a learning device (1) (i) has instructed one or more convolutional layers to generate at least one initial feature map for training by applying one or more convolution operations to at least one training image, (ii) has instructed an RPN to generate one or more proposals for training corresponding to each of one or more objects for training in the training image by using the initial feature map for training, and (iii) (iii-1) has instructed a pooling layer to apply one or more pooling operations to each region, corresponding to each of the proposals for training, on the initial feature map for training, to thereby generate pooled feature maps for training per each of the proposals for training, and has instructed a first transposing layer to concatenate each of pixels, per each of the proposals for training, in each of corresponding same locations on the pooled feature maps for training per each of the proposals for training, to thereby generate an integrated feature map for training, or (iii-2) has instructed the pooling layer to apply the pooling operations to each region, corresponding to each of the proposals for training, on the initial feature map for training, to thereby generate the pooled feature maps for training per each of the proposals for training, and has instructed the pooling layer to concatenate each of the pixels, per each of the proposals for training, in each of the corresponding same locations on the pooled feature maps for training per each of the proposals for training, to thereby generate the integrated feature map for training, (2) has instructed a first 1×1 convolutional layer to apply a 1×1 convolution operation to the integrated feature map for training, to thereby generate a first adjusted feature map for training whose volume is adjusted, and has instructed a second 1×1 convolutional layer to apply the 1×1 convolution operation to the first adjusted feature map for training, to thereby generate a second adjusted feature map for training whose volume is adjusted, and (3) (3-1) (i) has instructed a second transposing layer to divide the second adjusted feature map for training by each of the pixels, to thereby generate pixel-wise feature maps for training per each of the proposals for training, and has instructed a classifying layer to generate object class information for training on each of the proposals for training by using the pixel-wise feature maps for training per each of the proposals for training, or (ii) has instructed the classifying layer to divide the second adjusted feature map for training by each of the pixels, to thereby generate the pixel-wise feature maps for training per each of the proposals for training, and has instructed the classifying layer to generate the object class information for training on each of the proposals for training by using the pixel-wise feature maps for training per each of the proposals for training, (3-2) has instructed a detecting layer to generate object detection information for training corresponding to the objects for training in the training image by referring to the object class information for training and the pixel-wise feature maps for training per each of the proposals for training, and (3-3) has instructed a detection loss layer to calculate one or more object detection losses by referring to the object detection information for training and its corresponding GT, to thereby learn at least part of parameters of the second 1×1 convolutional layer, the first 1×1 convolutional layer, and the convolutional layers by backpropagating the object detection losses; configured to execute the instructions to: perform processes of (I) (i) instructing the convolutional layers to generate at least one initial feature map for testing by applying the convolution operations to at least one test image, (ii) instructing the RPN to generate one or more proposals for testing corresponding to each of one or more objects for testing in the test image by using the initial feature map for testing, and (iii) (iii-1) instructing the pooling layer to apply the pooling operations to each region, corresponding to each of the proposals for testing, on the initial feature map for testing, to thereby generate pooled feature maps for testing per each of the proposals for testing, and instructing a first transposing layer to concatenate each of pixels, per each of the proposals for testing, in each of corresponding same locations on the pooled feature maps for testing per each of the proposals for testing, to thereby generate an integrated feature map for testing, or (iii-2) instructing the pooling layer to apply the pooling operations to each region, corresponding to each of the proposals for testing, on the initial feature map for testing, to thereby generate the pooled feature maps for testing per each of the proposals for testing, and instructing the pooling layer to concatenate each of the pixels, per each of the proposals for testing, in each of the corresponding same locations on the pooled feature maps for testing per each of the proposals for testing, to thereby generate the integrated feature map for testing, (II) instructing the first 1×1 convolutional layer to apply the 1×1 convolution operation to the integrated feature map for testing, to thereby generate a first adjusted feature map for testing whose volume is adjusted, and instructing the second 1×1 convolutional layer to apply the 1×1 convolution operation to the first adjusted feature map for testing, to thereby generate a second adjusted feature map for testing whose volume is adjusted, and (III) (III-1) (i) instructing the second transposing layer to divide the second adjusted feature map for testing by each of the pixels, to thereby generate pixel-wise feature maps for testing per each of the proposals for testing, and instructing the classifying layer to generate object class information for testing on each of the proposals for testing by using the pixel-wise feature maps for testing per each of the proposals for testing, or (ii) instructing the classifying layer to divide the second adjusted feature map for testing by each of the pixels, to thereby generate the pixel-wise feature maps for testing per each of the proposals for testing, and instructing the classifying layer to generate the object class information for testing on each of the proposals for testing by using the pixel-wise feature maps for testing per each of the proposals for testing, and (III-2) instructing the detecting layer to generate object detection information for testing corresponding to the objects for testing in the test image by referring to the object class information for testing and the pixel-wise feature maps for testing per each of the proposals for testing.

As one example, after the process of (1), the learning device has instructed an RPN loss layer to calculate one or more RPN losses by referring to the proposals for testing and their corresponding ground truths, to thereby learn at least part of parameters of the RPN by backpropagating the RPN losses.

As one example, supposing that the number of the proposals for testing is N, and that a width of the pooled feature maps for testing per each of the proposals for testing is M1 and a height thereof is M2, and that the number of channels of the pooled feature maps for testing per each of the proposals for testing is J, at the process of (I), the processor (i) instructs the first transposing layer to convert the pooled feature maps for testing per each of the proposals for testing into the integrated feature map for testing having a width of N, a height of 1, and a channel of M1·M2·J, or (ii) instructs the pooling layer to convert the pooled feature maps for testing per each of the proposals for testing into the integrated feature map for testing having the width of N, the height of 1, and the channel of M1·M2·J.

As one example, supposing that the number of filters in the first 1×1 convolutional layer is K, and that the number of filters in the second 1×1 convolutional layer is L, at the process of (II), the processor instructs the first 1×1 convolutional layer to generate the first adjusted feature map for testing having a volume of N·1·K resulting from a width of N, a height of 1, and a channel of K, and instructs the second 1×1 convolutional layer to generate the second adjusted feature map for testing having a volume of N·1·L resulting from the width of N, the height of 1, and a channel of L.

As one example, at the process of (III), the processor (i) instructs the second transposing layer to convert the second adjusted feature map for testing into the pixel-wise feature maps for testing per each of the proposals for testing having a volume of 1·1·L, resulting from a width of 1, a height of 1, and a channel of L, corresponding to each of N proposals for testing, or (ii) instructs the classifying layer to convert the second adjusted feature map for testing into the pixel-wise feature maps for testing per each of the proposals for testing having the volume of 1·1·L, resulting from the width of 1, the height of 1, and the channel of L, corresponding to each of the N proposals for testing.

As one example, the classifying layer uses at least one softmax algorithm.

As one example, the detecting layer uses at least one non-maximum suppression algorithm.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

FIG. 4 is a drawing schematically illustrating an integrated feature map generated by using the pooled feature maps for each of the proposals, used for the learning method for the object detector based on the CNN in accordance with one example embodiment of the present disclosure.

FIGS. 5A and 5B are drawings schematically illustrating (i) a first adjusted feature map generated by allowing a first 1×1 convolutional layer to apply one or more convolution operations to the integrated feature map and (ii) a second adjusted feature map generated by a second 1×1 convolutional layer applying the convolution operations to the first adjusted feature map, respectively, in accordance with one example embodiment of the present disclosure.

FIG. 6 is a drawing schematically illustrating pixel-wise feature maps per each of the proposals generated by using the second adjusted feature map, used for the learning method for the object detector based on the CNN in accordance with one example embodiment of the present disclosure.

DETAILED DESCRIPTION OF THE PREFERRED EMBODIMENTS

Figure 1:
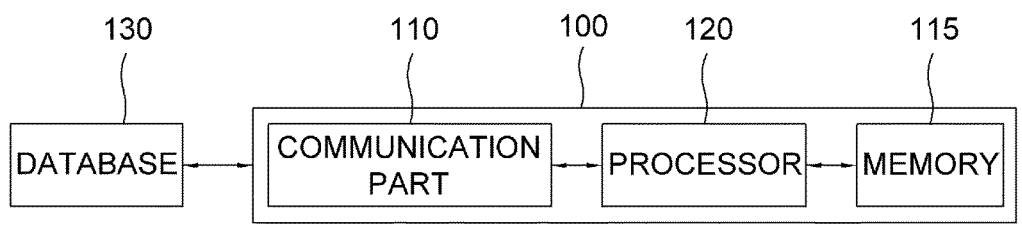
FIG. 1 is a drawing schematically illustrating a learning device for learning an object detector based on a CNN in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing schematically illustrating a learning device 100 of an object detector based on a CNN in accordance with one example embodiment of the present disclosure, and by referring to FIG. 1, the learning device 100 may include a communication part 110 and a processor 120.

First, the communication part 110 may receive at least one training image.

Herein, the training image may be stored in a database 300, and the database 300 may store at least one ground truth of class information on each of one or more objects and at least one ground truth of location information on each of the objects, corresponding to the training images.

In addition, the learning device may further include a memory 115 capable of storing computer readable instructions for performing following processes. As one example, the processor, the memory, a medium, etc. may be integrated with an integrated processor.

Then, the processor 120 may perform processes of (i) instructing one or more convolutional layers to generate at least one initial feature map by applying one or more convolution operations to the training image, (ii) instructing an RPN to generate one or more proposals corresponding to each of the objects in the training image by using the initial feature map, and (iii) (iii-1) instructing a pooling layer to apply one or more pooling operations to each region, corresponding to each of the proposals, on the initial feature map, to thereby generate pooled feature maps per each of the proposals, and instructing a first transposing layer to concatenate each of pixels, per each of the proposals, in each of corresponding same locations on the pooled feature maps per each of the proposals, to thereby generate an integrated feature map, or (iii-2) instructing the pooling layer to apply the pooling operations to each region, corresponding to each of the proposals, on the initial feature map, to thereby generate the pooled feature maps per each of the proposals, and instructing the pooling layer to concatenate each of the pixels, per each of the proposals, in each of the corresponding same locations on the pooled feature maps per each of the proposals, to thereby generate the integrated feature map.

Then, the processor 120 may perform processes of instructing a first 1×1 convolutional layer to apply a 1×1 convolution operation to the integrated feature map, to thereby generate a first adjusted feature map whose volume is adjusted, and instructing a second 1×1 convolutional layer to apply the 1×1 convolution operation to the first adjusted feature map, to thereby generate a second adjusted feature map 500B whose volume is adjusted. Thereafter, the processor 120 may perform processes of (i) instructing a second transposing layer to divide the second adjusted feature map 500B by each of the pixels, to thereby generate pixel-wise feature maps per each of the proposals, and instructing a classifying layer to generate object class information on each of the proposals by using the pixel-wise feature maps per each of the proposals, or (ii) instructing the classifying layer to divide the second adjusted feature map 500B by each of the pixels, to thereby generate the pixel-wise feature maps per each of the proposals, and instructing the classifying layer to generate the object class information on each of the proposals by using the pixel-wise feature maps per each of the proposals.

Then, the processor 120 may perform processes of instructing a detecting layer to generate object detection information corresponding to the objects in the training image by referring to the object class information and the pixel-wise feature maps per each of the proposals, and instructing a detection loss layer to calculate one or more object detection losses by referring to the object detection information and its corresponding GT, to thereby learn at least part of parameters of the second 1×1 convolutional layer, the first 1×1 convolutional layer, and the convolutional layers by backpropagating the object detection losses.

Further, the processor 120 may instruct an RPN loss layer to calculate one or more RPN losses by referring to the proposals and their corresponding ground truths, to thereby learn at least part of parameters of the RPN by backpropagating the RPN losses.

Herein, a temporal order of backpropagating the object detection losses and backpropagating the RPN losses is not limited.

Herein, the learning device 100 in accordance with one example of the present disclosure may be a computing device, and may be any digital device with a processor capable of computation. For reference, although FIG. 1 shows the single learning device 100, the scope of the present disclosure is not limited thereto. For example, the learning device may be configured as several devices to perform its functions.

Figure 2:
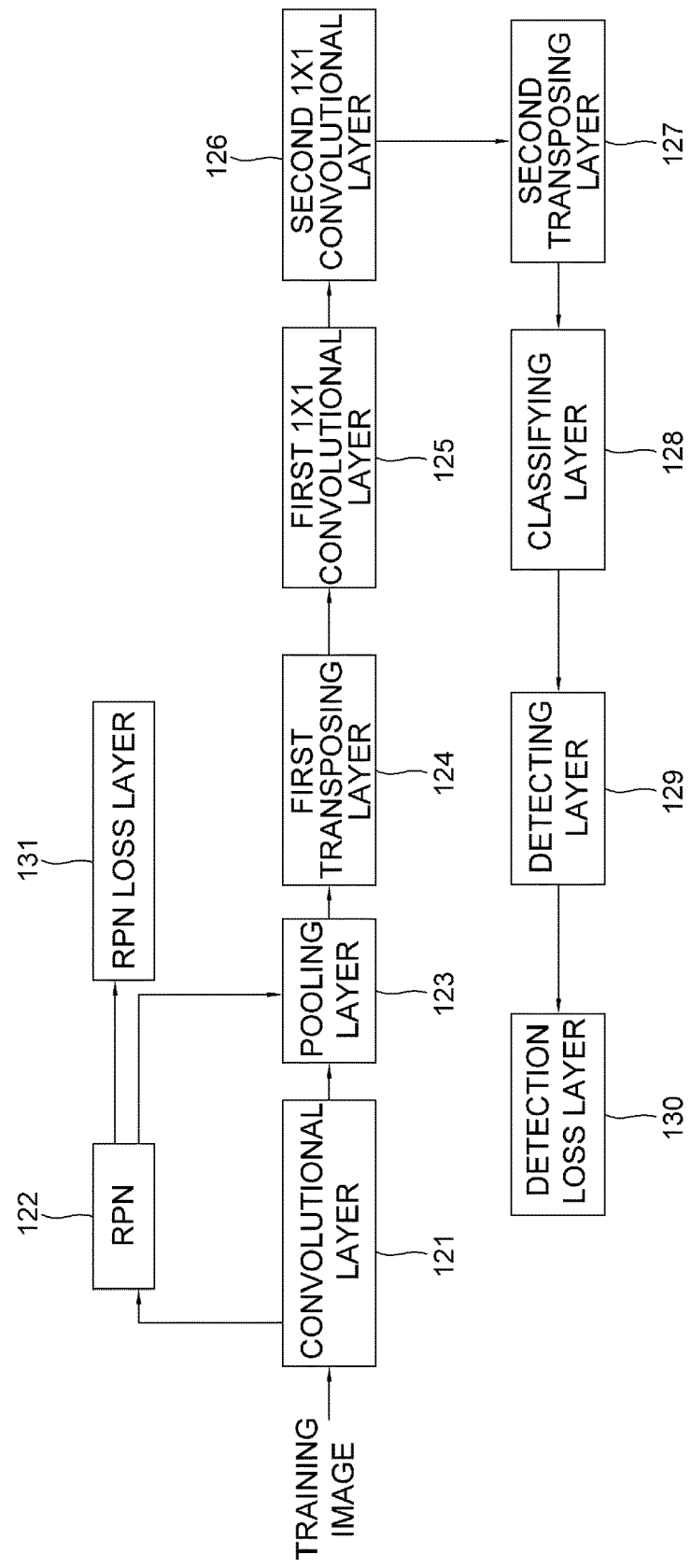
FIG. 2 is a drawing schematically illustrating a learning method for the object detector based on the CNN in accordance with one example embodiment of the present disclosure.

A method for learning parameters of the object detector based the CNN by using the learning device 100 in accordance with one example embodiment of the present disclosure is described by referring to FIG. 2 as follows.

First of all, if the training image is inputted, the learning device 100 may instruct a convolutional layer 121 to apply the convolution operations to the training image, to thereby generate the initial feature map. Herein, the convolutional layer 121 may be a single convolutional layer or multiple convolutional layers for sequential convolution operations on the training image.

Next, the learning device 100 may instruct an RPN 122 to generate one or more proposals corresponding to the objects in the training image by using the initial feature map. Herein, the RPN 122 may generate ROI candidates corresponding to candidate regions, where the objects are estimated as located, in the training image, and may output specific ROI candidates, having high probabilities by which the objects are determined as located, among the ROI candidates, as the proposals.

Next, the learning device 100 may instruct a pooling layer 123 to generate the pooled feature maps per each of the proposals by pooling each region, corresponding to each of the proposals, on the initial feature map.

Figure 3:
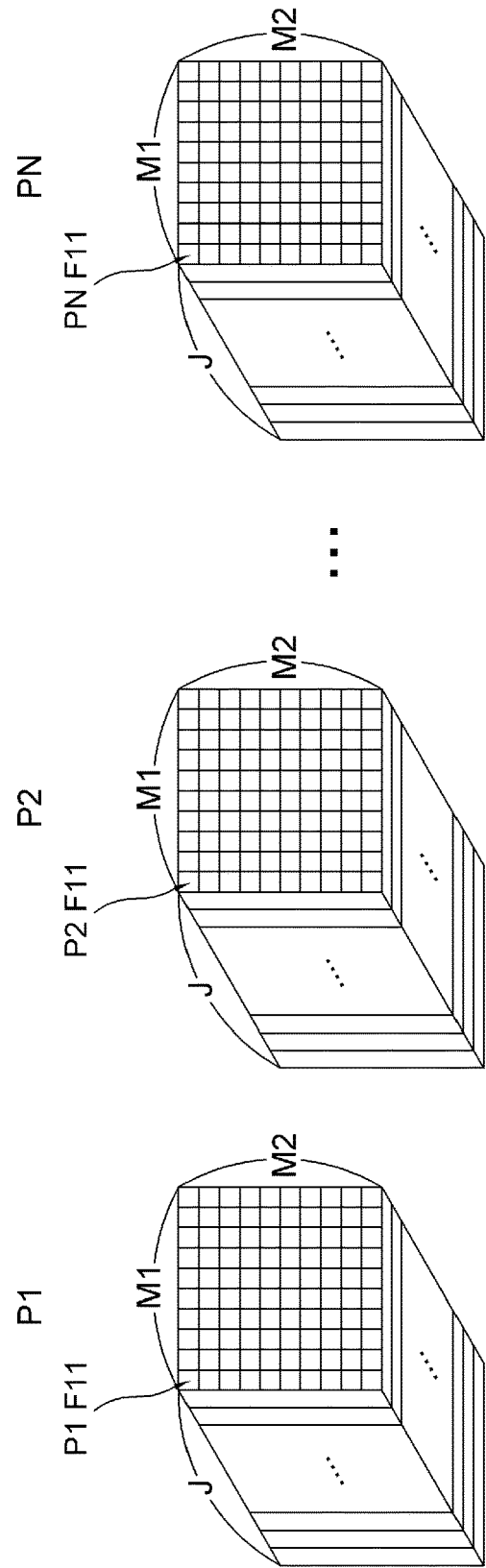
FIG. 3 is a drawing schematically illustrating pooled feature maps for each of proposals, generated by a pooling layer, used for the learning method for the object detector based on the CNN in accordance with one example embodiment of the present disclosure.

As one example, by referring to FIG. 3, supposing that the number of the proposals is N, and that a width of the pooled feature maps per each of the proposals is M1 and a height thereof is M2, and that the number of channels of the pooled feature maps per each of the proposals is J, each of the pooled feature maps P1, P2, . . . , and PN per each of the proposals may have a volume of M1·M2·J.

Then, the learning device 100 may instruct a first transposing layer 124 to concatenate each of the pixels, per each of the proposals, in each of corresponding same locations on the pooled feature maps P1, P2, . . . , and PN per each of the proposals, outputted from the pooling layer 123, to thereby generate the integrated feature map.

As one example, by referring to FIGS. 3 and 4, supposing that P1F11, P2F11, . . . , and PNF11 represent each of first pixels in each of the pooled feature maps P1, P2, . . . , and PN per each of the proposals in FIG. 3, and P1F11, P2F11, . . . , and PNF11 may be concatenated such that a first part of the integrated feature map 400 having a width of N and a height of 1 is generated, shown as a line in the front corresponding to the first channel among all the channels in FIG. 4, and this process is performed for the rest of the pixels. Next, the integrated feature map 400 may be generated as having channels of M1·M2·J which is equal to the number of the pixels in each of the pooled feature maps P1, P2, . . . , and PN per each of the proposals.

As explained above, the learning device 100 may instruct the first transposing layer 124 to generate the integrated feature map 400 by using the pooled feature maps P1, P2, . . . , and PN per each of the proposals outputted from the pooling layer 123. As another example, the learning device 100 may instruct the pooling layer 123 to generate the integrated feature map 400, without using the transposing layer 124. That is, as another example, the learning device 100 may instruct the pooling layer 123 to apply the pooling operations to each region, corresponding to each of the proposals, on the initial feature map, to thereby generate the pooled feature maps P1, P2, . . . , and PN per each of the proposals, and to concatenate each of the pixels, per each of the proposals, in each of corresponding same locations on the pooled feature maps P1, P2, . . . , and PN per each of the proposals, outputted from the pooling layer 123, to thereby generate the integrated feature map 400.

Then, the learning device 100 may perform processes of instructing a first 1×1 convolutional layer 125 to apply the 1×1 convolution operation to the integrated feature map 400, to thereby generate a first adjusted feature map 500A whose volume is adjusted, and instructing a second 1×1 convolutional layer 126 to apply the 1×1 convolution operation to the first adjusted feature map, to thereby generate a second adjusted feature map 500B whose volume is adjusted.

As one example, by referring to FIGS. 5A and 5B, supposing that the number of filters in the first 1×1 convolutional layer 125 is K and the number of filters in the second 1×1 convolutional layer 126 is L, the learning device 100 may perform processes of instructing the first 1×1 convolutional layer 125 to apply the 1×1 convolution operation to the integrated feature map 400 in FIG. 4, to thereby generate a first adjusted feature map 500A having a volume of N·1·K resulting from a width of N, a height of 1, and a channel of K as in FIG. 5A, and instructing the second 1×1 convolutional layer 126 to apply the 1×1 convolution operation to the first adjusted feature map 500A, to thereby generate a second adjusted feature map 500B having a volume of N·1·L resulting from a width of N, a height of 1, and a channel of L as in FIG. 5B.

Next, the learning device 100 may instruct a second transposing layer 127 to divide the second adjusted feature map 500B by each of the pixels, to thereby generate pixel-wise feature maps PW1, PW2, . . . , and PWN per each of the proposals.

As one example, by referring to FIG. 6, the learning device 100 may instruct the second transposing layer 127 to divide the second adjusted feature map 500B having a volume of N·1·L resulting from a width of N, a height of 1, and a channel of L as in FIG. 5B, by each of the pixels, to thereby generate the pixel-wise feature maps PW1, PW2, . . . , and PWN per each of the proposals, having a width of 1, a height of 1, and a channel of L.

Next, the learning device 100 may instruct a classifying layer 128 to generate the object class information on each of the proposals by using the pixel-wise feature maps PW1, PW2, . . . , and PWN per each of the proposals. Herein, the classifying layer 128 may use at least one softmax algorithm and may generate probability information on whether each of the proposals corresponds to each of the objects to be detected.

As explained above, the second transposing layer 127 may generate the pixel-wise feature maps PW1, PW2, . . . , and PWN per each of the proposals by using the second adjusted feature map 500B. As another example, the classifying layer 128 may generate the pixel-wise feature maps PW1, PW2, . . . , and PWN per each of the proposals by using the second adjusted feature map 500B, without using the second transposing layer 127. That is, the learning device 100 may instruct the classifying layer 128 to divide the second adjusted feature map 500B by each of the pixels, to thereby generate the pixel-wise feature maps PW1, PW2, . . . , and PWN per each of the proposals, and may instruct the classifying layer 128 to generate the object class information on each of the proposals by using the pixel-wise feature maps PW1, PW2, . . . , and PWN per each of the proposals.

Next, the learning device 100 may instruct a detecting layer 129 to generate the object detection information corresponding to the objects in the training image by referring to the object class information and the pixel-wise feature maps PW1, PW2, . . . , and PWN per each of the proposals. Herein, the detecting layer 129 may use an NMS algorithm, i.e., a non-maximum suppression algorithm, and if a single object is tagged by multiple proposals, may select at least one specific proposal thereamong with a high probability as the object detection information corresponding to the single object.

Then, the learning device 100 may instruct a detection loss layer 130 to generate one or more object detection losses by referring to the object detection information and its corresponding GT, to thereby adjust at least part of parameters of the second 1×1 convolutional layer 126 and the first 1×1 convolutional layer 125, and the convolutional layer 121 by backpropagating the object detection FC losses.

Also, the learning device 100 may instruct at least one RPN loss layer 131 corresponding to the RPN 122 to calculate one or more RPN losses by referring to the proposals and their corresponding GTs, to thereby adjust at least part of parameters of the RPN 122 by backpropagating the RPN losses.

The object detector based on the CNN in accordance with one example embodiment of the present disclosure above is comprised of the convolutional layers only, and thus capable of detecting the objects in the input image without regard to the size of the input image, which is not possible if the CNN uses conventional FC layers. Also, the object detector based on the CNN in accordance with one example embodiment of the present disclosure is capable of reducing amount of computation by applying locally connected operation of the 1×1 convolutional layer, compared to the fully connected operation of the conventional FC layers.

Figure 7:
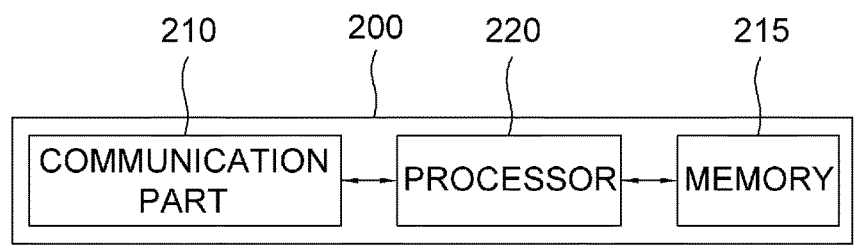
FIG. 7 is a drawing schematically illustrating a testing device for testing the object detector based on the CNN in accordance with one example embodiment of the present disclosure.

FIG. 7 is a drawing schematically illustrating a testing device 200 of the object detector based on the CNN in accordance with one example embodiment of the present disclosure, and by referring to FIG. 7, the testing device 200 may include a communication part 210 and a processor 220.

In addition, the testing device may further include a memory 215 capable of storing computer readable instructions for performing following processes. As one example, the processor, the memory, a medium, etc. may be integrated with an integrated processor.

For reference, in the description below, the phrase "for training" is added for terms related to the learning processes, and the phrase "for testing" is added for terms related to testing processes, to avoid possible confusion.

First, the communication part 210 may acquire or support another device to acquire at least one test image.

Herein, the object detector based on the CNN in accordance with one example of the present disclosure may be assumed to have been learned by the learning method described by referring to FIGS. 1 to 6.

That is, if at least one training image has been acquired, the learning device may have performed processes of (a) (i) instructing the convolutional layers to generate at least one initial feature map for training by applying the convolution operations to the training image, (ii) instructing the RPN to generate one or more proposals for training corresponding to each of one or more objects for training in the training image by using the initial feature map for training, and (iii) (iii-1) instructing the pooling layer to apply the pooling operations to each region, corresponding to each of the proposals for training, on the initial feature map for training, to thereby generate pooled feature maps for training per each of the proposals for training, and instructing the first transposing layer to concatenate each of pixels, per each of the proposals for training, in each of corresponding same locations on the pooled feature maps for training per each of the proposals for training, to thereby generate an integrated feature map for training, or (iii-2) instructing the pooling layer to apply the pooling operations to each region, corresponding to each of the proposals for training, on the initial feature map for training, to thereby generate the pooled feature maps for training per each of the proposals for training, and instructing the pooling layer to concatenate each of the pixels, per each of the proposals for training, in each of the corresponding same locations on the pooled feature maps for training per each of the proposals for training, to thereby generate the integrated feature map for training; (b) instructing the first 1×1 convolutional layer to apply the 1×1 convolution operation to the integrated feature map for training, to thereby generate a first adjusted feature map for training whose volume is adjusted, and instructing the second 1×1 convolutional layer to apply the 1×1 convolution operation to the first adjusted feature map for training, to thereby generate a second adjusted feature map for training whose volume is adjusted; and (c) (c1) (i) instructing the second transposing layer to divide the second adjusted feature map for training by each of the pixels, to thereby generate pixel-wise feature maps for training per each of the proposals for training, and instructing the classifying layer to generate object class information for training on each of the proposals for training by using the pixel-wise feature maps for training per each of the proposals for training, or (ii) instructing the classifying layer to divide the second adjusted feature map for training by each of the pixels, to thereby generate the pixel-wise feature maps for training per each of the proposals for training, and instructing the classifying layer to generate the object class information for training on each of the proposals for training by using the pixel-wise feature maps for training per each of the proposals for training, (c2) instructing the detecting layer to generate object detection information for training corresponding to the objects for training in the training image by referring to the object class information for training and the pixel-wise feature maps for training per each of the proposals for training, and (c3) instructing the detection loss layer to calculate one or more object detection losses by referring to the object detection information for training and its corresponding GT, to thereby learn at least part of the parameters of the second 1×1 convolutional layer, the first 1×1 convolutional layer, and the convolutional layers by backpropagating the object detection losses.

Further, the learning device may have instructed the RPN loss layer to calculate one or more RPN losses by referring to the proposals for training and their corresponding ground truths, to thereby learn at least part of the parameters of the RPN by backpropagating the RPN losses.

Then, the processor 120 may perform processes of (i) instructing the convolutional layers to generate at least one initial feature map for testing by applying the convolution operations to at least one test image, (ii) instructing the RPN to generate one or more proposals for testing corresponding to each of one or more objects for testing in the test image by using the initial feature map for testing, and (iii) (iii-1) instructing the pooling layer to apply the pooling operations to each region, corresponding to each of the proposals for testing, on the initial feature map for testing, to thereby generate pooled feature maps for testing per each of the proposals for testing, and instructing the first transposing layer to concatenate each of pixels, per each of the proposals for testing, in each of corresponding same locations on the pooled feature maps for testing per each of the proposals for testing, to thereby generate an integrated feature map for testing, or (iii-2) instructing the pooling layer to apply the pooling operations to each region, corresponding to each of the proposals for testing, on the initial feature map for testing, to thereby generate the pooled feature maps for testing per each of the proposals for testing, and instructing the pooling layer to concatenate each of the pixels, per each of the proposals for testing, in each of the corresponding same locations on the pooled feature maps for testing per each of the proposals for testing, to thereby generate the integrated feature map for testing. Then, the processor 220 may perform processes of instructing the first 1×1 convolutional layer to apply the 1×1 convolution operation to the integrated feature map for testing, to thereby generate a first adjusted feature map for testing whose volume is adjusted, and instructing the second 1×1 convolutional layer to apply the 1×1 convolution operation to the first adjusted feature map for testing, to thereby generate a second adjusted feature map for testing whose volume is adjusted. Thereafter, the processor 220 may perform processes of (i) instructing the second transposing layer to divide the second adjusted feature map for testing by each of the pixels, to thereby generate pixel-wise feature maps for testing per each of the proposals for testing, and instructing the classifying layer to generate object class information for testing on each of the proposals for testing by using the pixel-wise feature maps for testing per each of the proposals for testing, or (ii) instructing the classifying layer to divide the second adjusted feature map for testing by each of the pixels, to thereby generate the pixel-wise feature maps for testing per each of the proposals for testing, and instructing the classifying layer to generate the object class information for testing on each of the proposals for testing by using the pixel-wise feature maps for testing per each of the proposals for testing. Next, the processor 120 may instruct the detecting layer to generate object detection information for testing corresponding to the objects for testing in the test image by referring to the object class information for testing and the pixel-wise feature maps for testing per each of the proposals for testing.

Herein, the testing device 200 in accordance with one example embodiment of the present disclosure may be a computing device and may be any device with a processor capable of computation. For reference, although FIG. 7 shows the single testing device 200, but the scope of the present disclosure is not limited thereto. For example, the testing device may be configured as several devices to perform its functions.

Figure 8:
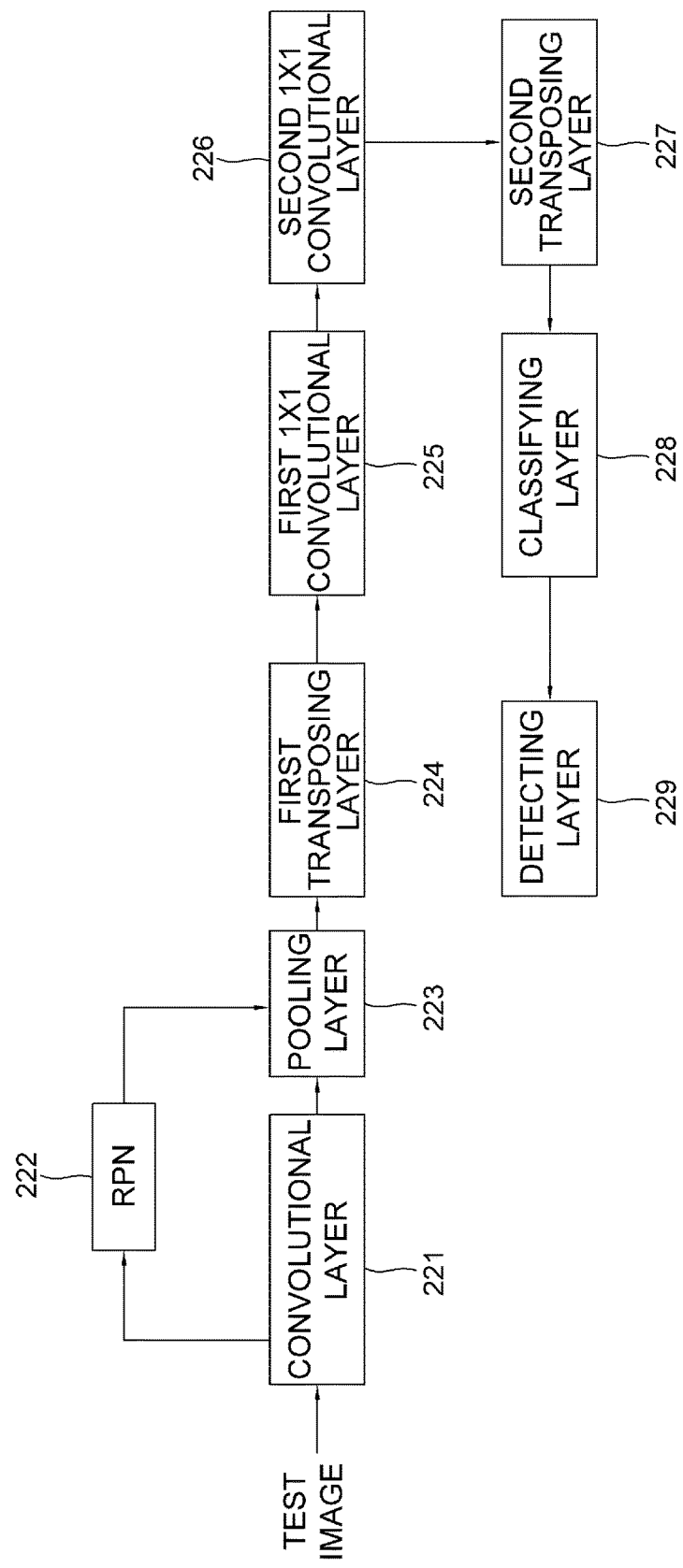
FIG. 8 is a drawing schematically illustrating a testing method for testing the object detector based on the CNN in accordance with one example embodiment of the present disclosure.

A method for learning parameters of the object detector based the CNN by using the testing device 200 in accordance with one example embodiment of the present disclosure is described by referring to FIG. 8 as follows. In the description below, the part easily deducible from the learning method described by referring to FIGS. 1 to 6 will be omitted.

First, on condition that at least part of parameters of a convolutional layer 221, an RPN 222, a first 1×1 convolutional layer 225, and a second 1×1 convolutional layer 226 has been learned according to the learning method described by referring to FIGS. 1 to 6, if the test image is inputted, the testing device 200 may instruct the convolutional layer 221 to apply the convolution operations to the test image, to thereby generate the initial feature map for testing. Herein, the convolutional layer 221 may be a single convolutional layer or multiple convolutional layers for the sequential convolution operations on the test image.

Next, the testing device 200 may instruct the RPN 222 to generate one or more proposals for testing, corresponding to each of the objects for testing, in the test image by using the initial feature map for testing. Herein, the RPN 222 may generate ROI candidates for testing, corresponding to candidate regions, where the objects for testing are estimated as located, in the test image, and may output specific ROI candidates for testing, having high probabilities, in which the objects for testing are determined as located, among the ROI candidates for testing, as proposals for testing.

Next, the testing device 200 may instruct a pooling layer 223 to generate pooled feature maps for testing per each of the proposals for testing by pooling each region, corresponding to each of the proposals for testing, on the initial feature map for testing.

Then, the testing device 200 may instruct the first transposing layer 224 to concatenate each of the pixels, per each of the proposals for testing, in each of corresponding same locations on the pooled feature maps for testing per each of the proposals for testing, outputted from the pooling layer 223, to thereby generate an integrated feature map for testing.

As explained above, the testing device 200 may instruct the first transposing layer 224 to generate the integrated feature map for testing by using the pooled feature maps for testing per each of the proposals for testing outputted from the pooling layer 223. As another example, the testing device 200 may instruct the pooling layer 123 to generate the integrated feature map for testing, without using the transposing layer 224. That is, the testing device 200 may instruct the pooling layer 223 to apply the pooling operations to each region, corresponding to each of the proposals for testing, on the initial feature map for testing, to thereby generate the pooled feature maps for testing per each of the proposals for testing, and to concatenate each of pixels, per each of the proposals for testing, in each of corresponding same locations on the pooled feature maps for testing per each of the proposals for testing, to thereby generate the integrated feature map for testing.

Then, the testing device 200 may perform processes of instructing a first 1×1 convolutional layer 225 to apply the 1×1 convolution operation to the integrated feature map for testing, to thereby generate a first adjusted feature map for testing whose volume is adjusted, and instructing a second 1×1 convolutional layer 226 to apply the 1×1 convolution operation to the first adjusted feature map for testing, to thereby generate a second adjusted feature map for testing whose volume is adjusted.

Next, the testing device 200 may instruct a second transposing layer 227 to divide the second adjusted feature map for testing by each of the pixels, to thereby generate pixel-wise feature maps for testing per each of the proposals for testing.

Next, the testing device 200 may instruct a classifying layer 228 to generate the object class information for testing on each of the proposals for testing by using the pixel-wise feature maps for testing per each of the proposals for testing. Herein, the classifying layer 228 may use the softmax algorithm and may generate probability information on whether each of the proposals for testing corresponds to each of the objects for testing to be detected.

As explained above, the second transposing layer 227 may generate the pixel-wise feature maps for testing per each of the proposals for testing by using the second adjusted feature map for testing. As another example, the classifying layer 228 may generate the pixel-wise feature maps for testing per each of the proposals for testing by using the second adjusted feature map for testing, without using the second transposing layer 227. That is, the testing device 200 may instruct the classifying layer 128 to divide the second adjusted feature map for testing by each of the pixels, to thereby generate the pixel-wise feature maps for testing per each of the proposals for testing, and may instruct the classifying layer 128 to generate the object class information for testing on each of the proposals for testing by using the pixel-wise feature maps for testing per each of the proposals for testing.

Next, the testing device 200 may instruct a detecting layer 229 to generate the object detection information for testing corresponding to the objects for testing in the test image by referring to the object class information for testing and the pixel-wise feature maps for testing per each of the proposals for testing. Herein, the detecting layer 229 may use the NMS algorithm, i.e., the non-maximum suppression algorithm, and if a single object for testing is tagged by multiple proposals for testing, may select at least one specific proposal for testing thereamong with a high probability as the object detection information for testing corresponding to the single object for testing.

The present disclosure has an effect of detecting the objects in the input image without regard to the size of the input image by implementing the object detector based on the CNN only with the convolutional layers.

The present disclosure has another effect of minimizing the number of weights for feature classification by implementing the object detector based on the CNN only with the convolutional layers, compared to the case of using the FC layers.

The present disclosure has still another effect of reducing computational load for the feature classification by implementing the object detector based on the CNN only with the convolutional layers, compared to the case of using the FC layers.

Since the convolution operations and the fully connected operations can be performed by a same processor in this method, hardware can be optimized by decreasing size of a chip, thereby satisfying KPI (key performance index). Accordingly, there are advantages such as no need to build additional lines in a semiconductor manufacturing process, power saving, more space to place other modules instead of an FC module in a die, and the like.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning parameters of an object detector based on a CNN, comprising steps of:
   (a) a learning device, if at least one training image is acquired, (i) instructing one or more convolutional layers to generate at least one initial feature map by applying one or more convolution operations to the training image, (ii) instructing an RPN to generate one or more proposals corresponding to each of one or more objects in the training image by using the initial feature map, and (iii) (iii-1) instructing a pooling layer to apply one or more pooling operations to each region, corresponding to each of the proposals, on the initial feature map, to thereby generate pooled feature maps per each of the proposals, and instructing a first transposing layer to concatenate each of pixels, per each of the proposals, in each of corresponding same locations on the pooled feature maps per each of the proposals, to thereby generate an integrated feature map, or (iii-2) instructing the pooling layer to apply the pooling operations to each region, corresponding to each of the proposals, on the initial feature map, to thereby generate the pooled feature maps per each of the proposals, and instructing the pooling layer to concatenate each of the pixels, per each of the proposals, in each of the corresponding same locations on the pooled feature maps per each of the proposals, to thereby generate the integrated feature map;

(b) the learning device instructing a first 1×1 convolutional layer to apply a 1×1 convolution operation to the integrated feature map, to thereby generate a first adjusted feature map whose volume is adjusted, and instructing a second 1×1 convolutional layer to apply the 1×1 convolution operation to the first adjusted feature map, to thereby generate a second adjusted feature map whose volume is adjusted; and (c) the learning device (c1) (i) instructing a second transposing layer to divide the second adjusted feature map by each of the pixels, to thereby generate pixel-wise feature maps per each of the proposals, and instructing a classifying layer to generate object class information on each of the proposals by using the pixel-wise feature maps per each of the proposals, or (ii) instructing the classifying layer to divide the second adjusted feature map by each of the pixels, to thereby generate the pixel-wise feature maps per each of the proposals, and instructing the classifying layer to generate the object class information on each of the proposals by using the pixel-wise feature maps per each of the proposals, (c2) instructing a detecting layer to generate object detection information corresponding to the objects in the training image by referring to the object class information and the pixel-wise feature maps per each of the proposals, and (c3) instructing a detection loss layer to calculate one or more object detection losses by referring to the object detection information and its corresponding GT, to thereby learn at least part of parameters of the second 1×1 convolutional layer, the first 1×1 convolutional layer, and the convolutional layers by backpropagating the object detection losses.

2. The method of claim 1, wherein, after the step of (a), the learning device instructs an RPN loss layer to calculate one or more RPN losses by referring to the proposals and their corresponding ground truths, to thereby learn at least part of parameters of the RPN by backpropagating the RPN losses.

3. The method of claim 1, wherein, supposing that the number of the proposals is N, and that a width of the pooled feature maps per each of the proposals is M1 and a height thereof is M2, and that the number of channels of the pooled feature maps per each of the proposals is J, at the step of (a), the learning device (i) instructs the first transposing layer to convert the pooled feature maps per each of the proposals into the integrated feature map having a width of N, a height of 1, and a channel of M1·M2·J, or (ii) instructs the pooling layer to convert the pooled feature maps per each of the proposals into the integrated feature map having the width of N, the height of 1, and the channel of M1·M2·J.

4. The method of claim 3, wherein, supposing that the number of filters in the first 1×1 convolutional layer is K, and that the number of filters in the second 1×1 convolutional layer is L, at the step of (b), the learning device instructs the first 1×1 convolutional layer to generate the first adjusted feature map having a volume of N·1·K resulting from a width of N, a height of 1, and a channel of K, and instructs the second 1×1 convolutional layer to generate the second adjusted feature map having a volume of N·1·L resulting from the width of N, the height of 1, and a channel of L.

5. The method of claim 4, wherein, at the step of (c), the learning device (i) instructs the second transposing layer to, convert the second adjusted feature map into the pixel-wise feature maps per each of the proposals having a volume of 1·1·L, resulting from a width of 1, a height of 1, and a channel of L, corresponding to each of N proposals, or (ii) instructs the classifying layer to convert the second adjusted feature map into the pixel-wise feature maps per each of the proposals having the volume of 1·1·L, resulting from the width of 1, the height of 1, and the channel of L, corresponding to each of the N proposals.

6. The method of claim 1, wherein the classifying layer uses at least one softmax algorithm.

7. The method of claim 1, wherein the detecting layer uses at least one non-maximum suppression algorithm.

8. A method for testing an object detector based on a CNN, comprising steps of:

(a) on condition that a learning device (1) (i) has instructed one or more convolutional layers to generate at least one initial feature map for training by applying one or more convolution operations to at least one training image, (ii) has instructed an RPN to generate one or more proposals for training corresponding to each of one or more objects for training in the training image by using the initial feature map for training, and (iii) (iii-1) has instructed a pooling layer to apply one or more pooling operations to each region, corresponding to each of the proposals for training, on the initial feature map for training, to thereby generate pooled feature maps for training per each of the proposals for training, and has instructed a first transposing layer to concatenate each of pixels, per each of the proposals for training, in each of corresponding same locations on the pooled feature maps for training per each of the proposals for training, to thereby generate an integrated feature map for training, or (iii-2) has instructed the pooling layer to apply the pooling operations to each region, corresponding to each of the proposals for training, on the initial feature map for training, to thereby generate the pooled feature maps for training per each of the proposals for training, and has instructed the pooling layer to concatenate each of the pixels, per each of the proposals for training, in each of the corresponding same locations on the pooled feature maps for training per each of the proposals for training, to thereby generate the integrated feature map for training, (2) has instructed a first 1×1 convolutional layer to apply a 1×1 convolution operation to the integrated feature map for training, to thereby generate a first adjusted feature map for training whose volume is adjusted, and has instructed a second 1×1 convolutional layer to apply the 1×1 convolution operation to the first adjusted feature map for training, to thereby generate a second adjusted feature map for training whose volume is adjusted, and (3) (3-1) (i) has instructed a second transposing layer to divide the second adjusted feature map for training by each of the pixels, to thereby generate pixel-wise feature maps for training per each of the proposals for training, and has instructed a classifying layer to generate object class information for training on each of the proposals for training by using the pixel-wise feature maps for training per each of the proposals for training, or (ii) has instructed the classifying layer to divide the second adjusted feature map for training by each of the pixels, to thereby generate the pixel-wise feature maps for training per each of the proposals for training, and has instructed the classifying layer to generate the object class information for training on each of the proposals for training by using the pixel-wise feature maps for training per each of the proposals for training, (3-2) has instructed a detecting layer to generate object detection information for training corresponding to the objects for training in the training image by referring to the object class information for training and the pixel-wise feature maps for training per each of the proposals for training, and (3-3) has instructed a detection loss layer to calculate one or more object detection losses by referring to the object detection information for training and its corresponding GT, to thereby learn at least part of parameters of the second 1×1 convolutional layer, the first 1×1 convolutional layer, and the convolutional layers by backpropagating the object detection losses; a testing device, if at least one test image is acquired, (i) instructing the convolutional layers to generate at least one initial feature map for testing by applying the convolution operations to the test image, (ii) instructing the RPN to generate one or more proposals for testing corresponding to each of one or more objects for testing in the test image by using the initial feature map for testing, and (iii) (iii-1) instructing the pooling layer to apply the pooling operations to each region, corresponding to each of the proposals for testing, on the initial feature map for testing, to thereby generate pooled feature maps for testing per each of the proposals for testing, and instructing a first transposing layer to concatenate each of pixels, per each of the proposals for testing, in each of corresponding same locations on the pooled feature maps for testing per each of the proposals for testing, to thereby generate an integrated feature map for testing, or (iii-2) instructing the pooling layer to apply the pooling operations to each region, corresponding to each of the proposals for testing, on the initial feature map for testing, to thereby generate the pooled feature maps for testing per each of the proposals for testing, and instructing the pooling layer to concatenate each of the pixels, per each of the proposals for testing, in each of the corresponding same locations on the pooled feature maps for testing per each of the proposals for testing, to thereby generate the integrated feature map for testing;
(b) the testing device instructing the first 1×1 convolutional layer to apply the 1×1 convolution operation to the integrated feature map for testing, to thereby generate a first adjusted feature map for testing whose volume is adjusted, and instructing the second 1×1 convolutional layer to apply the 1×1 convolution operation to the first adjusted feature map for testing, to thereby generate a second adjusted feature map for testing whose volume is adjusted; and
(c) the testing device (c1) (i) instructing the second transposing layer to divide the second adjusted feature map for testing by each of the pixels, to thereby generate pixel-wise feature maps for testing per each of the proposals for testing, and instructing the classifying layer to generate object class information for testing on each of the proposals for testing by using the pixel-wise feature maps for testing per each of the proposals for testing, or (ii) instructing the classifying layer to divide the second adjusted feature map for testing by each of the pixels, to thereby generate the pixel-wise feature maps for testing per each of the proposals for testing, and instructing the classifying layer to generate the object class information for testing on each of the proposals for testing by using the pixel-wise feature maps for testing per each of the proposals for testing, and (c2) instructing the detecting layer to generate object detection information for testing corresponding to the objects for testing in the test image by referring to the object class information for testing and the pixel-wise feature maps for testing per each of the proposals for testing.

9. The method of claim 8, wherein, after the process of (1), the learning device has instructed an RPN loss layer to calculate one or more RPN losses by referring to the proposals for testing and their corresponding ground truths, to thereby learn at least part of parameters of the RPN by backpropagating the RPN losses.

10. The method of claim 8, wherein, supposing that the number of the proposals for testing is N, and that a width of the pooled feature maps for testing per each of the proposals for testing is M1 and a height thereof is M2, and that the number of channels of the pooled feature maps for testing per each of the proposals for testing is J, at the step of (a), the testing device (i) instructs the first transposing layer to convert the pooled feature maps for testing per each of the proposals for testing into the integrated feature map for testing having a width of N, a height of 1, and a channel of M1·M2·J, or (ii) instructs the pooling layer to convert the pooled feature maps for testing per each of the proposals for testing into the integrated feature map for testing having the width of N, the height of 1, and the channel of M1·M2·J.

11. The method of claim 10, wherein, supposing that the number of filters in the first 1×1 convolutional layer is K, and that the number of filters in the second 1×1 convolutional layer is L, at the step of (b), the testing device instructs the first 1×1 convolutional layer to generate the first adjusted feature map for testing having a volume of N·1·K resulting from a width of N, a height of 1, and a channel of K, and instructs the second 1×1 convolutional layer to generate the second adjusted feature map for testing having a volume of N·1·L resulting from the width of N, the height of 1, and a channel of L.

12. The method of claim 11, wherein, at the step of (c), the testing device (i) instructs the second transposing layer to convert the second adjusted feature map for testing into the pixel-wise feature maps for testing per each of the proposals for testing having a volume of 1·1·L, resulting from a width of 1, a height of 1, and a channel of L, corresponding to each of N proposals for testing, or (ii) instructs the classifying layer to convert the second adjusted feature map for testing into the pixel-wise feature maps for testing per each of the proposals for testing having the volume of 1·1·L, resulting from the width of 1, the height of 1, and the channel of L, corresponding to each of the N proposals for testing.

13. The method of claim 8, wherein the classifying layer uses at least one softmax algorithm.

14. The method of claim 8, wherein the detecting layer uses at least one non-maximum suppression algorithm.

15. A learning device for learning parameters of an object detector based on a CNN, comprising:
- at least one memory that stores instructions; and
- at least one processor configured to execute the instructions to: perform processes of (I) (i) instructing one or more convolutional layers to generate at least one initial feature map by applying one or more convolution operations to at least one training image, (ii) instructing an RPN to generate one or more proposals corresponding to each of one or more objects in the training image by using the initial feature map, and (iii) (iii-1) instructing a pooling layer to apply one or more pooling operations to each region, corresponding to each of the proposals, on the initial feature map, to thereby generate pooled feature maps per each of the proposals, and instructing a first transposing layer to concatenate each of pixels, per each of the proposals, in each of corresponding same locations on the pooled feature maps per each of the proposals, to thereby generate an integrated feature map, or (iii-2) instructing the pooling layer to apply the pooling operations to each region, corresponding to each of the proposals, on the initial feature map, to thereby generate the pooled feature maps per each of the proposals, and instructing the pooling layer to concatenate each of the pixels, per each of the proposals, in each of the corresponding same locations on the pooled feature maps per each of the proposals, to thereby generate the integrated feature map, (II) instructing a first 1×1 convolutional layer to apply a 1×1 convolution operation to the integrated feature map, to thereby generate a first adjusted feature map whose volume is adjusted, and instructing a second 1×1 convolutional layer to apply the 1×1 convolution operation to the first adjusted feature map, to thereby generate a second adjusted feature map whose volume is adjusted, and (III) (III-1) (i) instructing a second transposing layer to divide the second adjusted feature map by each of the pixels, to thereby generate pixel-wise feature maps per each of the proposals, and instructing a classifying layer to generate object class information on each of the proposals by using the pixel-wise feature maps per each of the proposals, or (ii) instructing the classifying layer to divide the second adjusted feature map by each of the pixels, to thereby generate the pixel-wise feature maps per each of the proposals, and instructing the classifying layer to generate the object class information on each of the proposals by using the pixel-wise feature maps per each of the proposals, (III-2) instructing a detecting layer to generate object detection information corresponding to the objects in the training image by referring to the object class information and the pixel-wise feature maps per each of the proposals, and (III-3) instructing a detection loss layer to calculate one or more object detection losses by referring to the object detection information and its corresponding GT, to thereby learn at least part of parameters of the second 1×1 convolutional layer, the first 1×1 convolutional layer, and the convolutional layers by backpropagating the object detection losses.

16. The learning device of claim 15, wherein, after the process of (I), the processor instructs an RPN loss layer to calculate one or more RPN losses by referring to the proposals and their corresponding ground truths, to thereby learn at least part of parameters of the RPN by backpropagating the RPN losses.

17. The learning device of claim 15, wherein, supposing that the number of the proposals is N, and that a width of the pooled feature maps per each of the proposals is M1 and a height thereof is M2, and that the number of channels of the pooled feature maps per each of the proposals is J, at the process of (I), the processor (i) instructs the first transposing layer to convert the pooled feature maps per each of the proposals into the integrated feature map having a width of N, a height of 1, and a channel of M1·M2·J, or (ii) instructs the pooling layer to convert the pooled feature maps per each of the proposals into the integrated feature map having the width of N, the height of 1, and the channel of M1·M2·J.

18. The learning device of claim 17, wherein, supposing that the number of filters in the first 1×1 convolutional layer is K, and that the number of filters in the second 1×1 convolutional layer is L, at the process of (II), the processor instructs the first 1×1 convolutional layer to generate the first adjusted feature map having a volume of N·1·K resulting from a width of N, a height of 1, and a channel of K, and instructs the second 1×1 convolutional layer to generate the second adjusted feature map having a volume of N·1·L resulting from the width of N, the height of 1, and a channel of L.

19. The learning device of claim 18, wherein, at the process of (III), the processor (i) instructs the second transposing layer to convert the second adjusted feature map into the pixel-wise feature maps per each of the proposals having a volume of 1·1·L, resulting from a width of 1, a height of 1, and a channel of L, corresponding to each of N proposals, or (ii) instructs the classifying layer to convert the second adjusted feature map into the pixel-wise feature maps per each of the proposals having the volume of 1·1·L, resulting from the width of 1, the height of 1, and the channel of L, corresponding to each of the N proposals.

20. The learning device of claim 15, wherein the classifying layer uses at least one softmax algorithm.

21. The learning device of claim 15, wherein the detecting layer uses at least one non-maximum suppression algorithm.

22. A testing device for testing an object detector based on a CNN, comprising:
- at least one memory that stores instructions; and
- at least one processor, on condition that a learning device (1) (i) has instructed one or more convolutional layers to generate at least one initial feature map for training by applying one or more convolution operations to at least one training image, (ii) has instructed an RPN to generate one or more proposals for training corresponding to each of one or more objects for training in the training image by using the initial feature map for training, and (iii) (iii-1) has instructed a pooling layer to apply one or more pooling operations to each region, corresponding to each of the proposals for training, on the initial feature map for training, to thereby generate pooled feature maps for training per each of the proposals for training, and has instructed a first transposing layer to concatenate each of pixels, per each of the proposals for training, in each of corresponding same locations on the pooled feature maps for training per each of the proposals for training, to thereby generate an integrated feature map for training, or (iii-2) has instructed the pooling layer to apply the pooling operations to each region, corresponding to each of the proposals for training, on the initial feature map for training, to thereby generate the pooled feature maps for training per each of the proposals for training, and has instructed the pooling layer to concatenate each of the pixels, per each of the proposals for training, in each of the corresponding same locations on the pooled feature maps for training per each of the proposals for training, to thereby generate the integrated feature map for training, (2) has instructed a first 1×1 convolutional layer to apply a 1×1 convolution operation to the integrated feature map for training, to thereby generate a first adjusted feature map for training whose volume is adjusted, and has instructed a second 1×1 convolutional layer to apply the 1×1 convolution operation to the first adjusted feature map for training, to thereby generate a second adjusted feature map for training whose volume is adjusted, and (3) (3-1) (i) has instructed a second transposing layer to divide the second adjusted feature map for training by each of the pixels, to thereby generate pixel-wise feature maps for training per each of the proposals for training, and has instructed a classifying layer to generate object class information for training on each of the proposals for training by using the pixel-wise feature maps for training per each of the proposals for training, or (ii) has instructed the classifying layer to divide the second adjusted feature map for training by each of the pixels, to thereby generate the pixel-wise feature maps for training per each of the proposals for training, and has instructed the classifying layer to generate the object class information for training on each of the proposals for training by using the pixel-wise feature maps for training per each of the proposals for training, (3-2) has instructed a detecting layer to generate object detection information for training corresponding to the objects for training in the training image by referring to the object class information for training and the pixel-wise feature maps for training per each of the proposals for training, and (3-3) has instructed a detection loss layer to calculate one or more object detection losses by referring to the object detection information for training and its corresponding GT, to thereby learn at least part of parameters of the second 1×1 convolutional layer, the first 1×1 convolutional layer, and the convolutional layers by backpropagating the object detection losses; configured to execute the instructions to: perform processes of (I) (i) instructing the convolutional layers to generate at least one initial feature map for testing by applying the convolution operations to at least one test image, (ii) instructing the RPN to generate one or more proposals for testing corresponding to each of one or more objects for testing in the test image by using the initial feature map for testing, and (iii) (iii-1) instructing the pooling layer to apply the pooling operations to each region, corresponding to each of the proposals for testing, on the initial feature map for testing, to thereby generate pooled feature maps for testing per each of the proposals for testing, and instructing a first transposing layer to concatenate each of pixels, per each of the proposals for testing, in each of corresponding same locations on the pooled feature maps for testing per each of the proposals for testing, to thereby generate an integrated feature map for testing, or (iii-2) instructing the pooling layer to apply the pooling operations to each region, corresponding to each of the proposals for testing, on the initial feature map for testing, to thereby generate the pooled feature maps for testing per each of the proposals for testing, and instructing the pooling layer to concatenate each of the pixels, per each of the proposals for testing, in each of the corresponding same locations on the pooled feature maps for testing per each of the proposals for testing, to thereby generate the integrated feature map for testing, (II) instructing the first 1×1 convolutional layer to apply the 1×1 convolution operation to the integrated feature map for testing, to thereby generate a first adjusted feature map for testing whose volume is adjusted, and instructing the second 1×1 convolutional layer to apply the 1×1 convolution operation to the first adjusted feature map for testing, to thereby generate a second adjusted feature map for testing whose volume is adjusted, and (III) (III-1) (i) instructing the second transposing layer to divide the second adjusted feature map for testing by each of the pixels, to thereby generate pixel-wise feature maps for testing per each of the proposals for testing, and instructing the classifying layer to generate object class information for testing on each of the proposals for testing by using the pixel-wise feature maps for testing per each of the proposals for testing, or (ii) instructing the classifying layer to divide the second adjusted feature map for testing by each of the pixels, to thereby generate the pixel-wise feature maps for testing per each of the proposals for testing, and instructing the classifying layer to generate the object class information for testing on each of the proposals for testing by using the pixel-wise feature maps for testing per each of the proposals for testing, and (III-2) instructing the detecting layer to generate object detection information for testing corresponding to the objects for testing in the test image by referring to the object class information for testing and the pixel-wise feature maps for testing per each of the proposals for testing.

23. The testing device of claim 22, wherein, after the process of (1), the learning device has instructed an RPN loss layer to calculate one or more RPN losses by referring to the proposals for testing and their corresponding ground truths, to thereby learn at least part of parameters of the RPN by backpropagating the RPN losses.

24. The testing device of claim 22, wherein, supposing that the number of the proposals for testing is N, and that a width of the pooled feature maps for testing per each of the proposals for testing is M1 and a height thereof is M2, and that the number of channels of the pooled feature maps for testing per each of the proposals for testing is J, at the process of (I), the processor (i) instructs the first transposing layer to convert the pooled feature maps for testing per each of the proposals for testing into the integrated feature map for testing having a width of N, a height of 1, and a channel of M1·M2·J, or (ii) instructs the pooling layer to convert the pooled feature maps for testing per each of the proposals for testing into the integrated feature map for testing having the width of N, the height of 1, and the channel of M1·M2·J.

25. The testing device of claim 24, wherein, supposing that the number of filters in the first 1×1 convolutional layer is K, and that the number of filters in the second 1×1 convolutional layer is L, at the process of (II), the processor instructs the first 1×1 convolutional layer to generate the first adjusted feature map for testing having a volume of N·1·K resulting from a width of N, a height of 1, and a channel of K, and instructs the second 1×1 convolutional layer to generate the second adjusted feature map for testing having a volume of N·1·L resulting from the width of N, the height of 1, and a channel of L.

26. The testing device of claim 25, wherein, at the process of (III), the processor (i) instructs the second transposing layer to convert the second adjusted feature map for testing into the pixel-wise feature maps for testing per each of the proposals for testing having a volume of 1·1·L, resulting from a width of 1, a height of 1, and a channel of L, corresponding to each of N proposals for testing, or (ii) instructs the classifying layer to convert the second adjusted feature map for testing into the pixel-wise feature maps for testing per each of the proposals for testing having the volume of 1·1·L, resulting from the width of 1, the height of 1, and the channel of L, corresponding to each of the N proposals for testing.

27. The testing device of claim 22, wherein the classifying layer uses at least one softmax algorithm.

28. The testing device of claim 22, wherein the detecting layer uses at least one non-maximum suppression algorithm.

* * * * *